(12) United States Patent
Liu

(10) Patent No.: US 7,716,019 B2
(45) Date of Patent: *May 11, 2010

(54) COMPUTER-AIDED PROGRESSIVE DIE DESIGN SYSTEM AND METHOD

(75) Inventor: Shengming Liu, Artesia City, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 11/420,180

(22) Filed: May 24, 2006

(65) Prior Publication Data

US 2006/0264125 A1    Nov. 23, 2006

Related U.S. Application Data

(63) Continuation of application No. 10/039,188, filed on Dec. 31, 2001, now Pat. No. 7,065,478.

(51) Int. Cl.
    *G06F 17/50* (2006.01)
(52) U.S. Cl. ............................ 703/1; 700/97; 700/98; 700/182; 29/888.073; 29/888.092; 76/101.1
(58) Field of Classification Search .................... 703/1, 703/7; 700/83, 97, 98, 182, 197; 29/417, 29/7.2, 888.073, 888.092, 893.34, 894.353; 76/101.1
    See application file for complete search history.

(56) References Cited

U.S. PATENT DOCUMENTS

| | | | |
|---|---|---|---|
| RE24,439 E * | 3/1958 | Banko | 83/685 |
| 3,784,439 A | 1/1974 | Dorman | |
| 3,860,803 A * | 1/1975 | Levine | 700/98 |
| 4,517,649 A | 5/1985 | Kitagawa | |
| 4,846,033 A * | 7/1989 | Uehlinger et al. | 83/94 |
| 4,995,289 A * | 2/1991 | Bakermans | 83/690 |
| 5,095,419 A * | 3/1992 | Seki et al. | 700/83 |
| 5,309,704 A * | 5/1994 | Grando | 59/13 |
| 5,357,446 A * | 10/1994 | Maeda et al. | 700/160 |
| 5,417,097 A * | 5/1995 | Kojima et al. | 72/335 |
| 5,472,350 A * | 12/1995 | Mehta | 439/107 |
| 5,742,288 A * | 4/1998 | Nishizaka et al. | 345/418 |

(Continued)

OTHER PUBLICATIONS

Z. C. Lin, and C. Y. Hsu, "An Investigation of an Expert System for Shearing Cut Progressive Die Design" 1996, The International Journal of Advanced Manufacturing Technology.*

*Primary Examiner*—Kamini S Shah
*Assistant Examiner*—Kibrom Gebresilassie
(74) *Attorney, Agent, or Firm*—Michael J. Wallace, Jr.

(57) ABSTRACT

According to one embodiment of the invention, a computerized method for designing a progressive die used in the manufacturing of a part formed from sheet metal includes receiving, at a computer, information regarding one or more features of the part, and determining, by the computer, a blank layout for the part based on the features of the part and the number of parts desired. The computer further determines one or more details of a strip for the blank layout, information regarding a die base based on the details of the strip, and information regarding one or more inserts for die plates of the die base based on operations of the processes needed to form the features in the part. The computerized method further includes generating, by the computer, one or more outputs associated with the progressive die.

20 Claims, 9 Drawing Sheets

U.S. PATENT DOCUMENTS

| | | | |
|---|---|---|---|
| 5,793,015 A * | 8/1998 | Walczyk | 219/121.67 |
| 5,819,388 A * | 10/1998 | Salm | 29/424 |
| 5,890,276 A * | 4/1999 | Lorincz | 29/564.6 |
| 5,927,920 A * | 7/1999 | Swanstrom | 411/180 |
| 6,079,922 A * | 6/2000 | Ross et al. | 411/180 |
| 6,092,278 A * | 7/2000 | Latkow | 29/609 |
| 6,477,930 B1 * | 11/2002 | Sandford | 83/162 |
| 6,722,015 B2 * | 4/2004 | Sirois et al. | 29/596 |
| 7,065,478 B2 * | 6/2006 | Liu | 703/7 |
| 7,546,669 B1 * | 6/2009 | Ying | 29/430 |
| 2002/0078768 A1 * | 6/2002 | Hiatt et al. | 73/864.41 |
| 2003/0029023 A1 * | 2/2003 | Sirois et al. | 29/596 |
| 2004/0123639 A1 * | 7/2004 | Anderson | 72/361 |
| 2006/0021414 A1 * | 2/2006 | Cowie | 72/335 |
| 2006/0277745 A1 * | 12/2006 | Muncy et al. | 29/558 |

* cited by examiner

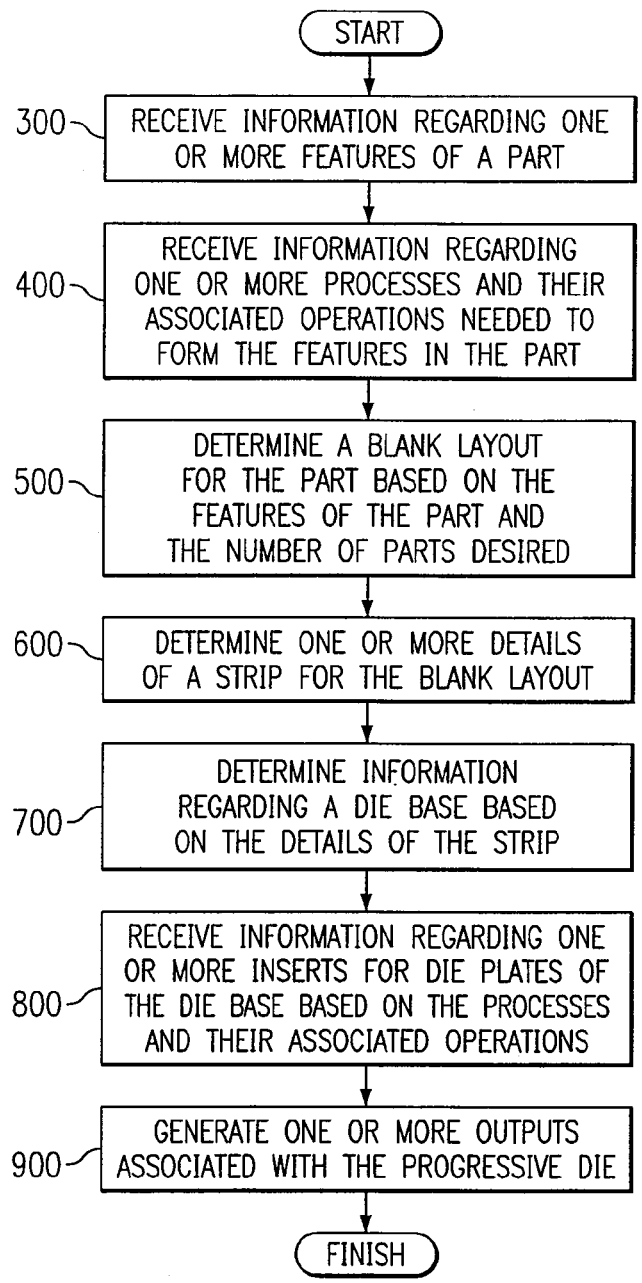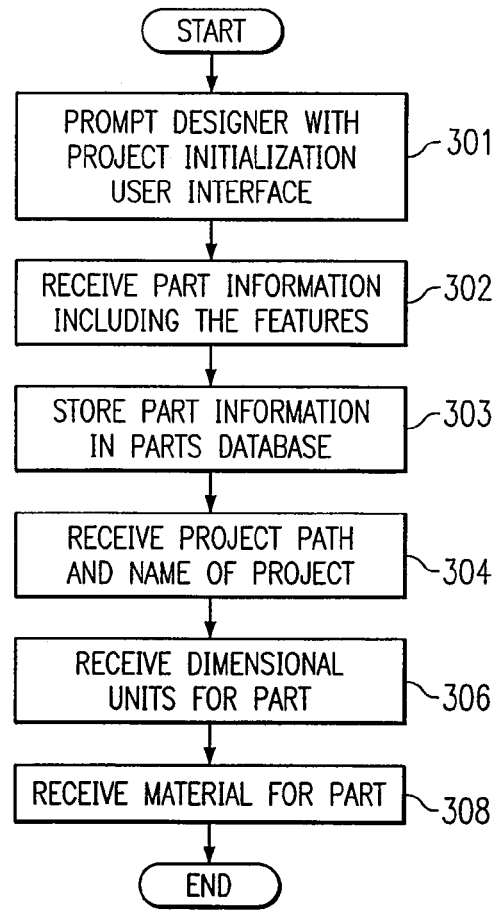

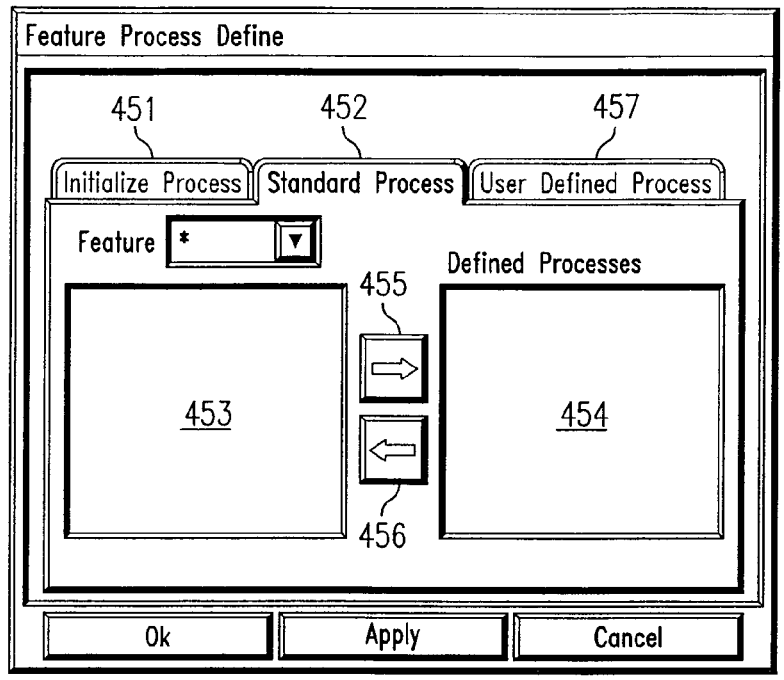

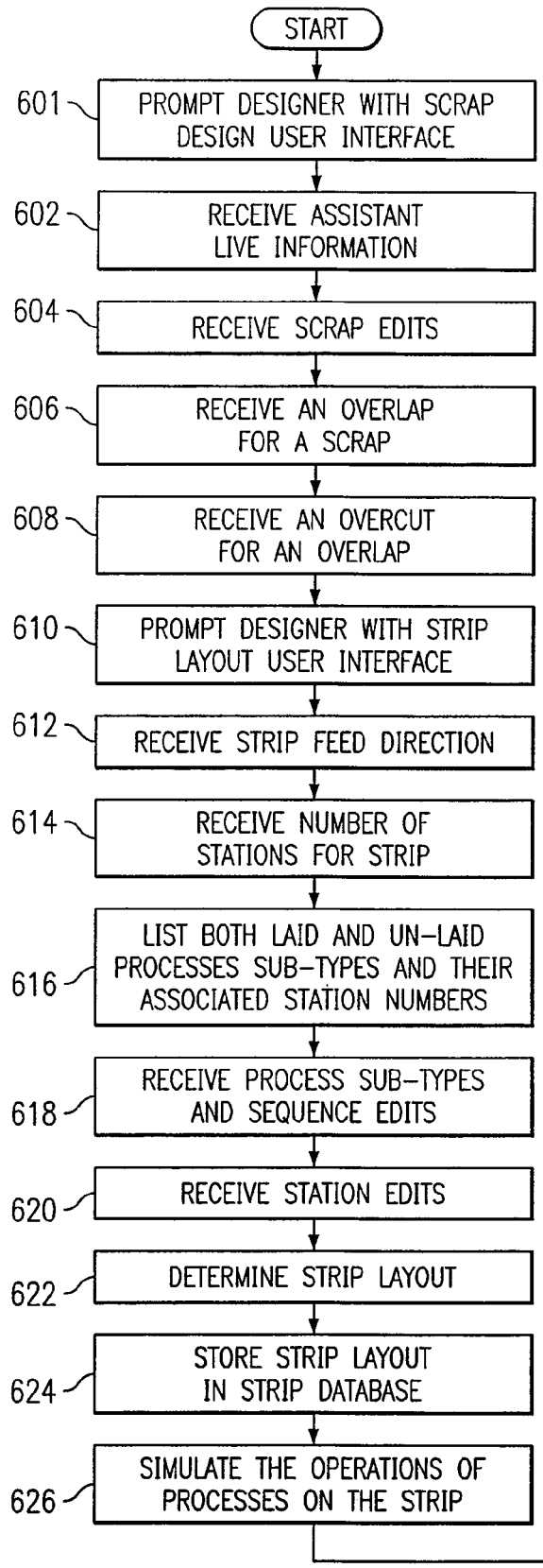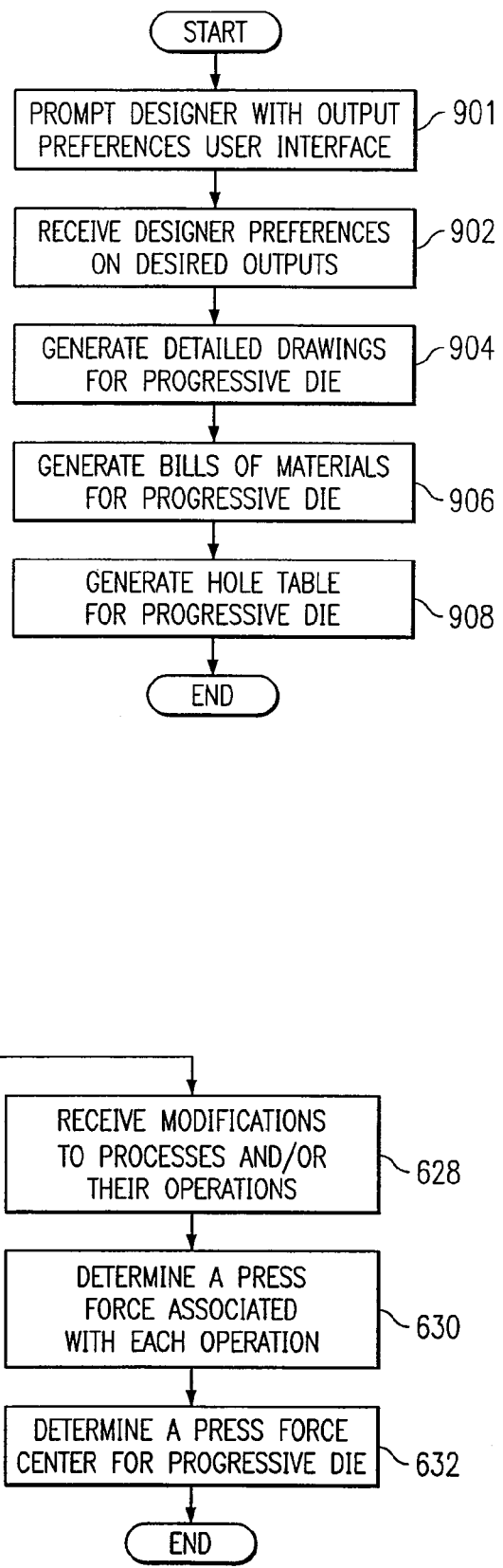

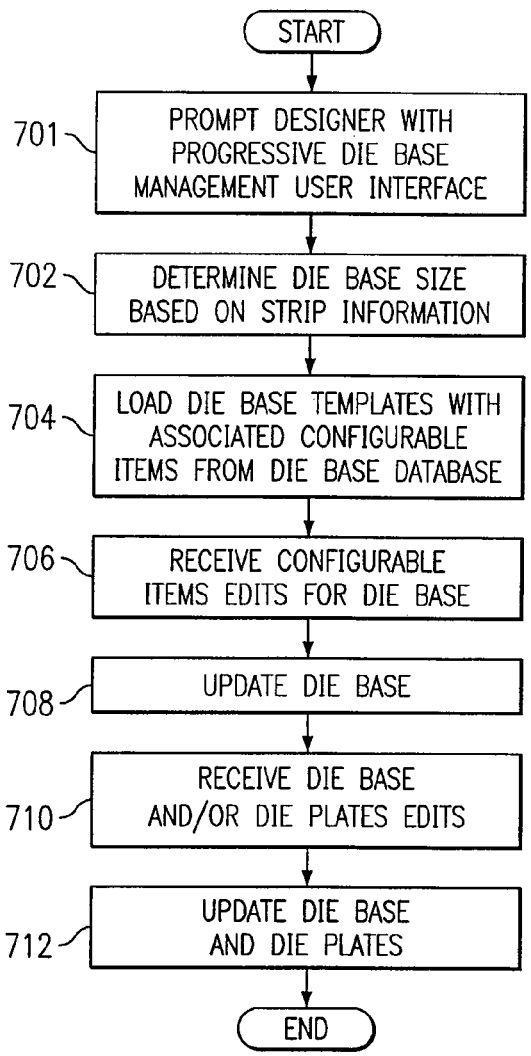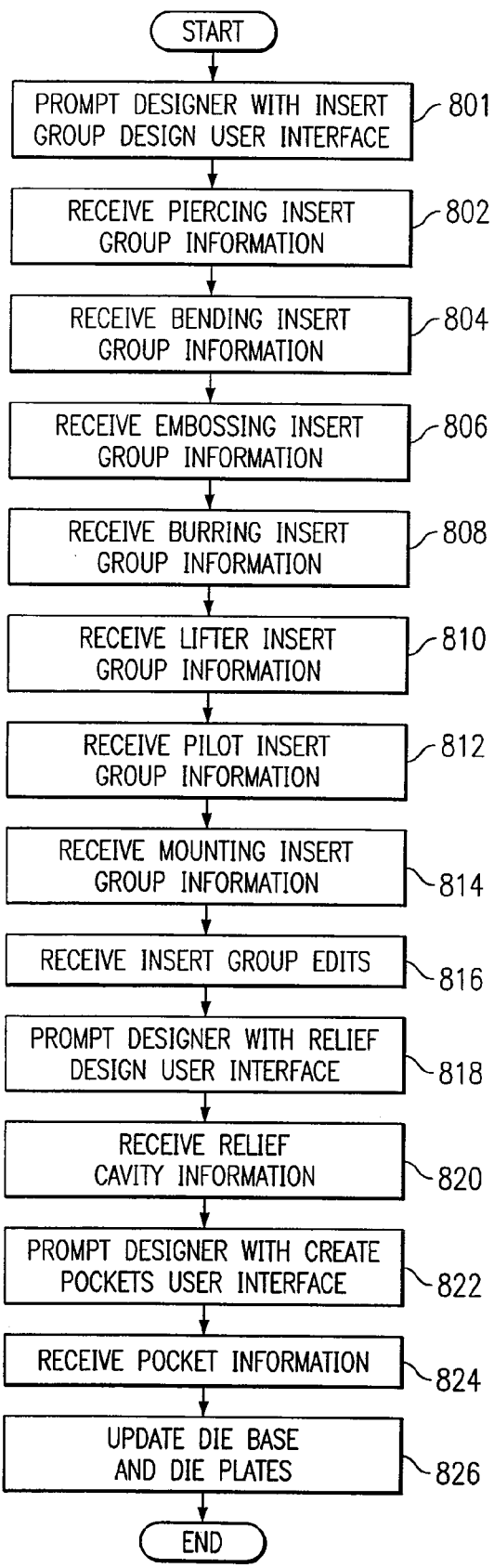

COMPUTER-AIDED PROGRESSIVE DIE DESIGN SYSTEM AND METHOD

RELATED APPLICATIONS

This application is a continuation application of U.S. application Ser. No. 10/039,188 filed Dec. 31, 2001.

TECHNICAL FIELD OF THE INVENTION

The present invention relates generally to the computer-aided design ("CAD") industry and, more particularly, to a computer-aided progressive die design system and method.

BACKGROUND OF THE INVENTION

Progressive dies are used to transform flat strips of sheet metal into a formed part. This transformation is performed progressively by a series of stations that cut, punch, form, and bend the material into a desired shape. A progressive die that performs the various forming operations on the material is unique for every part. The various components that make up the die are located in guided and precision cut openings in plates, which are in turn located and guided by pins. The entire die is actuated by a mechanical press that moves the die up and down, and the sheet metal is fed through the die progressing from one station to the next.

Progressive die design is a relatively complex and highly iterative process. When a die company receives a design from a customer, for example, it is common practice to remodel the components using the die company's own system, the original drawings, or a 3D model. The next step involves process planning. This involves unfolding, blank layout, scrap design and strip layout. Then the main die structure must be addressed. This normally includes the die base design, in addition to a great number of inserts, standard parts, and relief design depending on the complexity of the part being manufactured. After this stage is complete the detailed drawings are produced for the progressive die. Each step is a relatively manual one. Consequently, it is time-consuming and expensive. In addition, design modifications to the initial part must be run through the entire process manually, largely due to the lack of associativity among the different systems that are employed. A great amount of design knowledge and experience is required.

Today's progressive die manufacturers face a number of issues that hold back improvements in productivity, quality, and turnaround time. These range from a lack of experienced progressive die designers, the difficulties involved in speeding up and improving quality in the more traditional design methods, and a shortage of any specific, easy-to-use, productive software solutions for progressive die design. In order to maintain their competitive edge and survive, more and more progressive die companies are looking to adopt three-dimensional computer-aided design ("3D CAD") technology.

SUMMARY OF THE INVENTION

According to one embodiment of the invention, a computerized method for designing a progressive die used in the manufacturing of a part formed from sheet metal includes receiving, at a computer, information regarding one or more features of the part, and determining, by the computer, a blank layout for the part based on the features of the part and the number of parts desired. The computer further determines one or more details of a strip for the blank layout, information regarding a die base based on the details of the strip, and information regarding one or more inserts for die plates of the die base based on operations of the processes needed to form the features in the part. The computerized method further includes generating, by the computer, one or more outputs associated with the progressive die.

Embodiments of the invention provide a number of technical advantages. Embodiments of the invention may include all, some, or none of these advantages. In one embodiment, a computer-aided progressive die design method captures an industry's specific process knowledge, promotes the most efficient work flow, and links complex elements of design technology into automated sequences. What once was only in the minds of experts may now be easily utilized by less experienced people. By automatically extracting sheet metal features and mapping them to process features, representing a company's design standards, users can capture a multitude of designs. Efficient and easy-to-use blank layout design tools enable designers to efficiently lay out process features in numerous operation stations while minimizing material scrap. Once done, 3D strip layout simulations provide immediate feedback for design and process changes. In addition, customizable die base libraries, standard part libraries, and insert group libraries expedite the die structure design and ensure that users' complete processes are handled effectively.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which:

FIG. 2 is a flowchart illustrating a computerized method of designing a progressive die according to one embodiment of the invention;

FIG. 3A is a flowchart illustrating a computerized method of receiving information regarding one or more features of a part according to one embodiment of the invention;

FIG. 4B is an example Feature Process Define user interface used in the method of FIG. 4A;

FIG. 4C is an example Process Selection sub-user interface used in the method of FIG. 4A;

FIG. 6A is a flowchart illustrating a computerized method of determining one or more details of a strip for a blank layout according to one embodiment of the invention;

FIG. 7 is a flowchart illustrating a computerized method of determining information regarding a die base based on details of a strip according to one embodiment of the invention;

FIG. 8A is a flowchart illustrating a computerized method of receiving information regarding one or more inserts for die plates of a die base according to one embodiment of the invention;

FIG. 9 is a flowchart illustrating a computerized method of generating one or more outputs associated with a progressive die according to one embodiment of the invention.

DETAILED DESCRIPTION OF EXAMPLE EMBODIMENTS OF THE INVENTION

Example embodiments of the present invention and their advantages are best understood by referring now to FIGS. 1 through 9 of the drawings, in which like numerals refer to like parts.

Figure 1A:
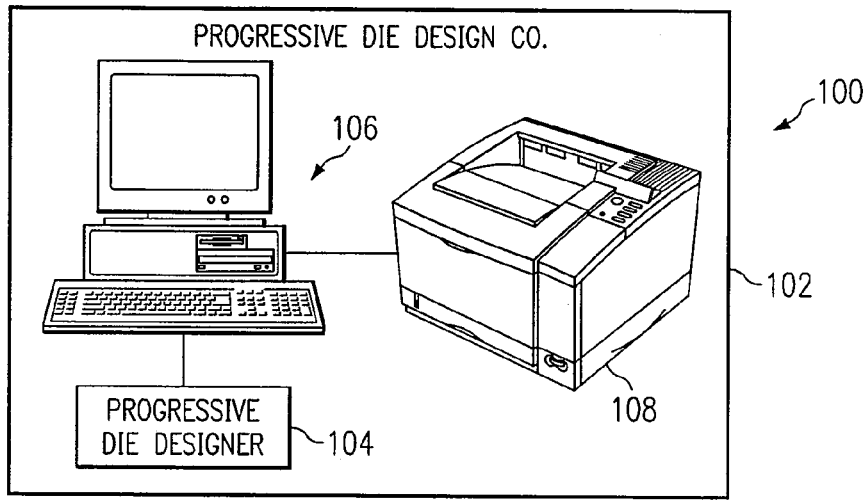
FIG. 1A is a block diagram illustrating a computer-aided progressive die design system according to one embodiment of the invention.

FIG. 1a is a block diagram illustrating a computer-aided progressive die design system 100 according to one embodiment of the present invention. System 100 includes a progressive die design company 102 employing a progressive die designer 104 having access to a computer 200 and a printer 108. Progressive die design company 102 may be any company or other suitable entity that designs progressive dies. Progressive die design company 102 often has a goal of producing high-quality progressive dies within short lead-times. Because progressive die design is a relatively complex and highly iterative process, the present invention provides a computerized method and system for designing progressive dies used in manufacturing parts formed from sheet metal. Some embodiments of the present invention capture the industry's specific process knowledge, promote the most efficient workflow, and link complex elements of progressive die design technology into automated sequences. This computerized method is utilized by progressive die designer 104, which may be either an individual employee or a group of employees employed by progressive die design company 102.

Figure 1B:
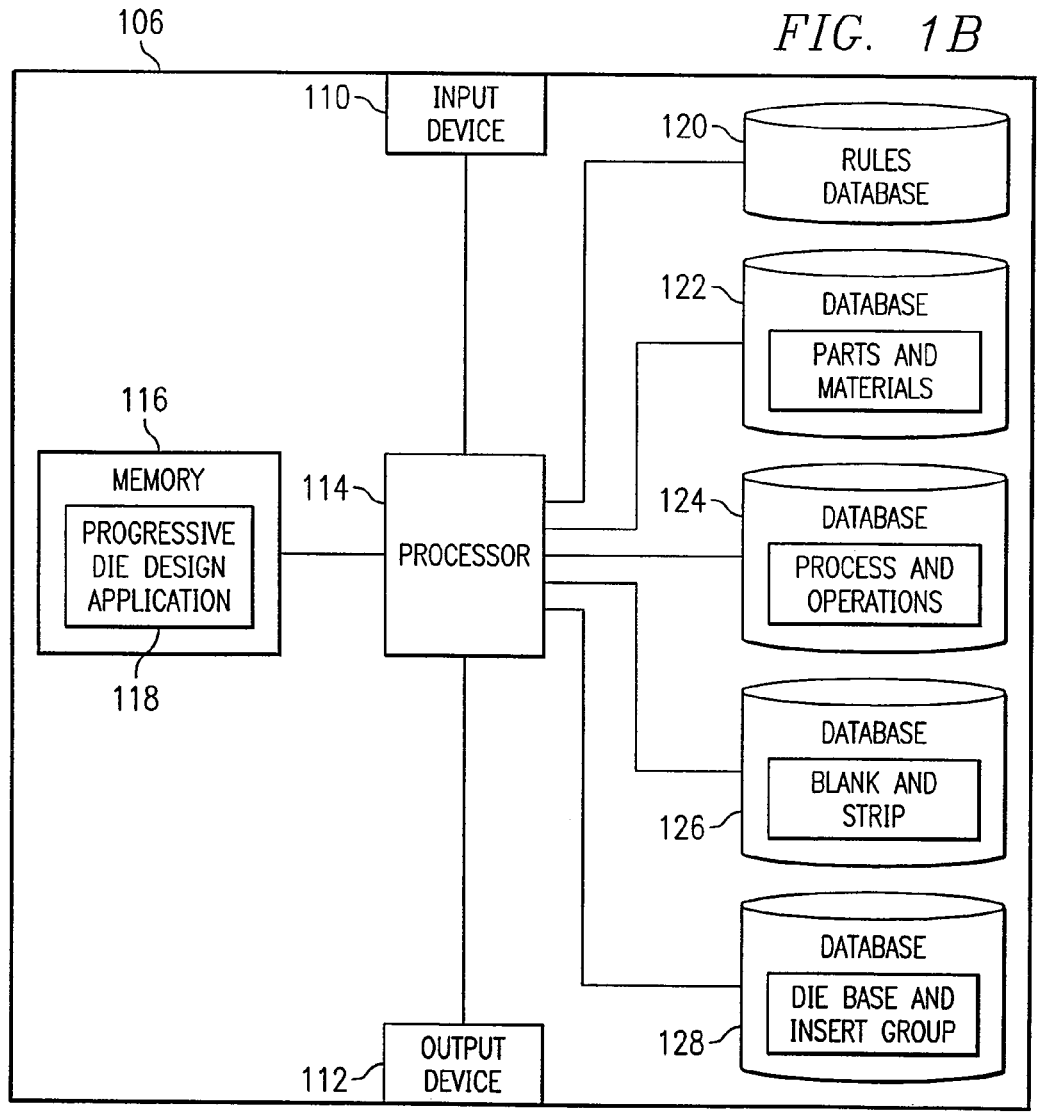
FIG. 1B is a block diagram of a computer in the system of FIG. 1 for use in designing progressive dies according to one embodiment of the invention.

FIG. 1B is a block diagram of computer 106 for use in designing progressive dies according to one embodiment of the present invention. As illustrated, computer 106 includes an input device 110, an output device 112, a processor 114, a memory 116 storing progressive die design application 118, a rules database 120, a parts and materials database 122, a processes and operations database 124, a blank and strip database 126, and a die base and insert group database 128.

Input device 110 is coupled to computer 106 for allowing progressive die designer 104 to utilize progressive die design application 118. For example, as discussed below, progressive die designer 104 utilizes progressive die design application 118 through a series of user interfaces contained within progressive die design application 118. This allows progressive die designer 104 to input, select, and/or manipulate various data and information. In one embodiment, input device 110 is a keyboard; however, input device 110 may take other forms, such as a mouse, a stylus, a scanner, or any combination thereof. Output device 112 is any suitable visual display unit, such as a liquid crystal display ("LCD") or cathode ray tube ("CRT") display, that allows progressive die designer 104 to see the progressive die and/or its components as it is being designed. Output device 112 may also be coupled to printer 108 for the purpose of printing any desired information, such as detailed drawings, bills of materials, or other suitable information.

Processor 114 comprises any suitable type of processing unit that executes logic. One of the functions of processor 114 is to retrieve progressive die design application 118 from memory 116 and execute progressive die design application 118 to allow progressive die designer 104 to design progressive dies. Other functions of progressive die design application 118 are discussed more fully below in conjunction with FIGS. 2 through 9. Processor 114 may also control the retrieving and/or storing of information and other suitable data, such as parts and materials information, processes and operations information, blank and strip data, or die base and insert group information.

Progressive die design application 118 is a computer program written in any suitable computer language. According to the teachings of the present invention, progressive die design application 118 is operable to utilize data and information stored in databases 120 through 128 and input by progressive die designer 104 for the purpose of designing progressive dies. Progressive die design application 118 may perform other suitable functions, such as controlling the printing of any of various outputs via printer 108. The functions of progressive die design application 118 are described below in conjunction with FIGS. 2 through 9.

Memory 116 and databases 120 through 128 may comprise files, stacks, databases, or other suitable organizations of volatile or nonvolatile memory. Memory 208 and databases 120 through 128 may be random-access memory, read-only memory, CD-ROM, removable memory devices, or any other suitable devices that allow storage and/or retrieval of data. Memory 116 and databases 120 through 128 are interchangeable and may perform the same functions. Details of databases 120 through 128 are described below in conjunction with the description of FIGS. 2 through 9. Briefly, rules database 120 stores various rules, formulas, tables, and other suitable logic that allows progressive die design application 118 to perform its function when designing a progressive die. Parts and materials database 122 stores information on sheet-metal parts and various sheet-metal materials. Processes and operations database 124 stores information regarding various processes and their associated operations that are used in a progressive die to manufacture a part. Blank and strip database 126 stores information regarding blanks and strips used in manufacturing sheet-metal parts. Die base and insert group 128 stores information regarding die bases and the various insert groups used in die plates of a progressive die.

FIG. 2 is a flowchart illustrating a computerized method of designing a progressive die according to one embodiment of the present invention. The computerized method outlined in FIG. 2, as well as the computerized methods outlined below in FIGS. 3A through 9 may be executed by progressive die design application 118 on computer 106 with the interaction of progressive die designer 104, or through other suitable techniques.

The method begins at step 300 where information regarding one or more features of a sheet-metal part is received by progressive die design application 118. Generally, the information received at this step is a mathematical representation of a sheet-metal part and its associated features that is desired to be manufactured with a progressive die. The mathematical representation may be obtained from any suitable geometric modeling. Details of step 300 are outlined below in conjunction with FIGS. 3A and 3B.

Information regarding one or more processes and their associated operations needed to form features in the part is received by progressive die design application 118 at step 400. Generally, based on information contained within rules database 120, progressive die design application 118 retrieves parameters of one or more processes and their associated operations from processes and operations database 124 based on the type of features in the part. Or, progressive die design application 118 may receive parameters of the processes and their associated operations from progressive die designer 104 via input 110. Details of step 400 are outlined below in conjunction with FIGS. 4A through 4C.

A blank layout for the part is determined by progressive die design application 118 at step 500. This blank layout is based on the features of the part and the number of parts desired. Generally, progressive die design application 118 determines a blank for the part based on the mathematical model that was received at step 300. Progressive die design application 118 also determines a blank layout for the part via other information that is received from progressive die designer 104 or retrieved from blank and strip database 126 after requests from progressive die designer 104. Details of step 500 are described below in conjunction with FIGS. 5A and 5B.

One or more details of a strip for the blank layout is determined by progressive die design application 118 at step 600. Generally, based on inputs received from progressive die designer 104 regarding a strip, progressive die design application 118 determines one or more details of the strip, such as dimensions for the strip, feed direction, number of stations, scrap design, and press force center for the progressive die. This step may also entail simulating the operations of the processes on the strip in three dimensions to determine whether or not any modifications need to be made at this point in the design. Details of step 600 are outlined below in conjunction with FIGS. 6A through 6C.

Information regarding a die base is determined by progressive die design application 118 at step 700 based on the details of the strip. A die base includes various die plates, such as a stripper plate, a bottoming plate, a punch plate, etc. Generally, progressive die design application 118 retrieves a die base template from die base and insert group database 128 so that progressive die designer 104 may input edits for the die base and its configurable items. Details of step 700 are described below in conjunction with FIG. 7.

Information regarding one or more inserts for die plates of the die base is received by progressive die design application 118 at step 800 based on the processes and their associated operations. Generally, progressive die design application 118 receives a design of all the insert groups required for the die plates of the die base. These designs are retrieved from data and information stored in die base and insert group database 128. The insert group designs are retrieved by progressive die design application 118 so that progressive die designer 104 may modify the design of one or more insert groups. Relief design and pocket design for the die plates are also performed at this step, as described in further detail below. Details of step 800 are described below in conjunction with FIGS. 8A through 8C.

One or more outputs associated with a progressive die is generated at step 900. Generally, progressive die design application 118 generates any suitable output related to a progressive die, such as detailed drawings, bills of material, and a hole table. These outputs may be printed by printer 108. Details of step 900 are outlined below in conjunction with FIG. 9.

Figure 3B:
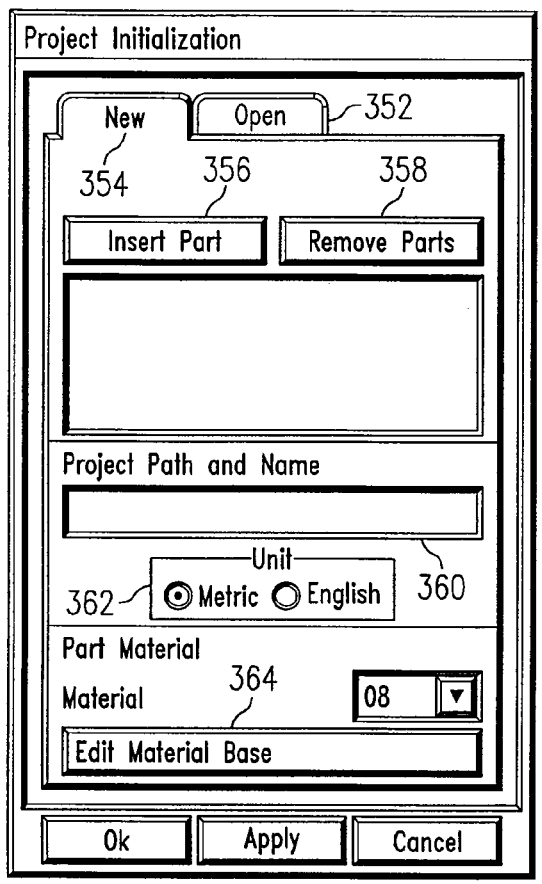
FIG. 3B is an example Project Initialization user interface used in the method of FIG. 3A.

FIG. 3A is a flowchart illustrating a computerized method of receiving information regarding one or more features of a part according to one embodiment of the present invention. Other embodiments may perform this method in a different manner. Progressive die designer 104 is prompted at step 301 with a Project Initialization user interface 350, an example of which is shown in FIG. 3B. At step 302, information regarding a part including its features is received by progressive die design application 118. Progressive die design application 118 may retrieve this part information from parts and materials database 122 by using an "Open" tab 352 as shown in user interface 350. If new part information is being received, then a "New" tab 354 is utilized by progressive die designer 104. As described above, part information includes a mathematical description of a sheet-metal part that is desired to be formed by a progressive die. If new part information is received at step 302, then progressive die design application 118 may store this part information in parts and materials database 122, as indicated by step 303. Parts may be stored in parts and materials database 122 by using an "Insert Part" button 356 or removed by using a "Remove Parts" button 358 in user interface 350.

A project path and name of a project is received at step 304 via a "Project Path and Name" screen box 360. In addition, dimensional units for the part are received at step 306 as a result of progressive die designer 104 selecting the appropriate Metric or English tab as shown at "Unit" box 362 in user interface 350. A sheet metal material for the part is received at step 308 by progressive die designer 104 selecting a material either contained within parts and materials database 122 or entering a new material. If a new material is entered, then this material may be stored in parts and materials database 122 using "Edit Material Base" button 364. When progressive die designer 104 is satisfied with the information in user interface 350, then the "OK" or "Apply" button is clicked so that the information may be captured by progressive die design application 118 and stored in the appropriate place for later use.

Figure 4A:
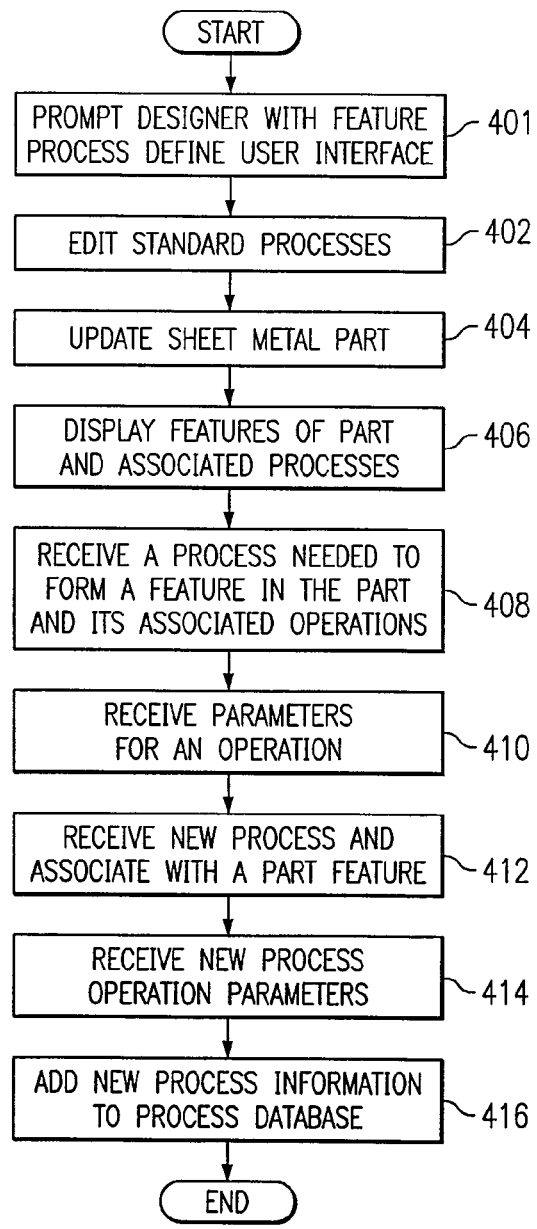
FIG. 4A is a flowchart illustrating a computerized method of receiving information regarding one or more processes and their associated operations according to one embodiment of the invention.

FIG. 4A is a flowchart illustrating a computerized method of receiving information regarding one or more processes and their associated operations according to one embodiment of the present invention. Other embodiments may perform this method in a different manner. The method begins at step 401 where progressive die designer 104 is prompted with a Feature Process Define user interface 450, an example of which is illustrated in FIG. 4B. Through user interface 450, progressive die designer 104 may select, remove, or edit various processes and their associated operations in designing a progressive die. Although not required, progressive die designer 104 may edit standard processes at step 402 by using an "Initialize Process" tab 451 of user interface 450. For example, standard processes may be stored in process and operations database 124 for later use. The operations associated with a stored process may be modified by progressive die designer 104 using "Initialize Process" tab 451. In addition, "Initialize Process" tab 451 may be used for other suitable functions, such as updating a sheet-metal part, as indicated by step 404, if features are added to a sheet-metal part after being received by progressive die design application 118.

When progressive die designer 104 selects a "Standard Process" tab 452 of user interface 450, features of the part and their associated processes are displayed, as indicated by step 406. For example, a feature list 453 may contain a list of features, such as a hole, a notch, a bend, a slot, or other suitable feature. The associated processes used to manufacture these features are also listed in a defined processes list 454.

At step 408, one or more processes and their associated operations needed to form one or more features in the part are received. These processes are listed in defined processes list 454 of user interface 450. These processes are automatically listed by progressive die design application 118 based on the features of the part listed in feature list 453. Progressive die design application 118 retrieves these processes from processes and operations database 124. Progressive die designer 104 may use a "Define Process" button 455 to specify details for a particular process. If progressive die designer 104 selects "Define Process" button 455, then a Process Selection user interface 460 pops up. An example of Process Selection user interface 460 is illustrated in FIG. 4C.

As illustrated in FIG. 4C, progressive die designer 104 may select the process type by using a pull-down menu 461. Any sub-types of this process are shown in a sub-type box 462 and any associated operations for this sub-type are shown in an operations box 463. Progressive die designer 104 may add sub-types to a process using user interface 460. In addition, operations associated with these sub-types are input using user interface 460. Parameters of operations may be defined by progressive die designer 104 using a parameters box 464. This coincides with step 410, in which parameters for an operation are received by progressive die design application 118. Progressive die designer 104 clicks OK or Apply when finished with defining a standard process. Standard processes may also be removed from the defined processes list by pressing a "Remove Process" button 456.

New processes and their associated operations may be received at step 412. This is accomplished using a "User Defined Process" tab 457 of user interface 450. Although the details of the user-defined process tap are not illustrated, generally, progressive die designer 104 may input user defined processes and their associated operations and associate them with a particular part feature. Parameters for these new processes and their operations may be received at step 414. These new processes may be stored in processes and operations database 124 at step 416 for later use.

Figure 5A:
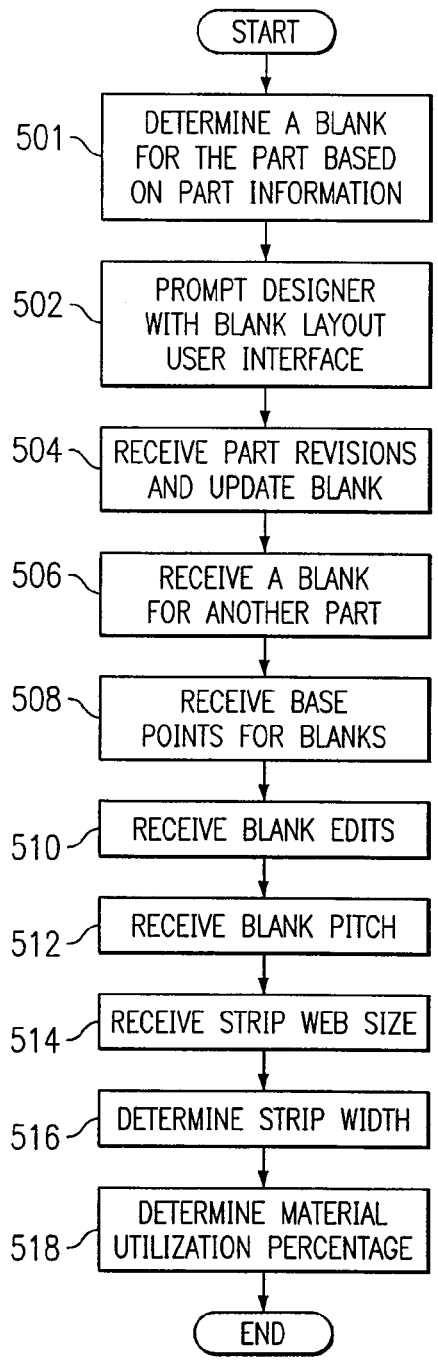
FIG. 5A is a flowchart illustrating a computerized method of determining a blank layout for a part based on the features of the part and the number of parts desired according to one embodiment of the invention.
Figure 5B:
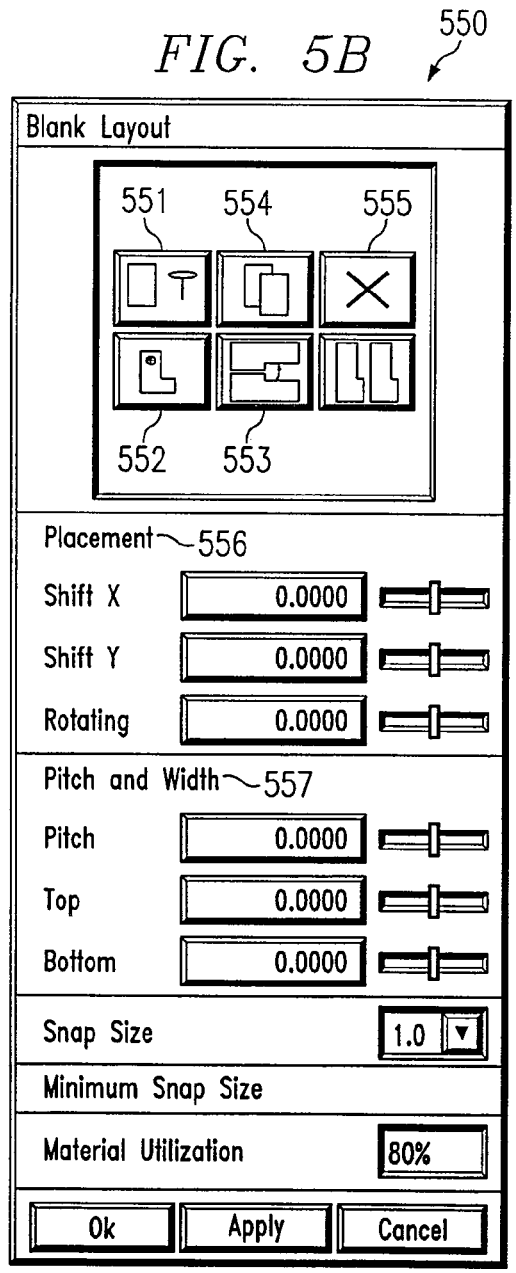
FIG. 5B is an example Blank Layout user interface used in the method of FIG. 5A.

FIG. 5A is a flowchart illustrating a computerized method for determining a blank layout for a part based on the features of the part and a number of parts desired according to one embodiment of the present invention. Other embodiments may perform this method in a different manner. The method begins at step 501 where a blank for a part is determined by progressive die design application 118. The blank is based on the part information (i.e., the mathematical representation of the part) that was received by progressive die design application 118 above in step 300. Progressive die design application 118, based on the mathematical representation of the part, can unfold the part to create a blank for the part. Progressive die designer 104 may interactively design a blank layout by using this blank via a Blank Layout user interface 550, an example of which is shown in FIG. 5B. Accordingly, at step 502, progressive die designer 104 is prompted with Blank Layout user interface 550.

At step 504, part revisions are received and the blank updated by progressive die design application 118 by utilizing an "update blank" button (not shown). An additional blank for a different part may be received at step 506 if another part is desired to be manufactured with the same progressive die being designed. An insert blank button 551 may be used by progressive die designer 104 to accomplish this. This different blank may be retrieved from blank and strip database 126. A base point for one or more blanks are received at step 508 by utilizing a set base point button 552 as shown in user interface 550. This base point allows the blank to be rotated if so desired.

As indicated by step 510, various blank edits are received by progressive die design application 118. This may include flipping the blank using a flip button 553, copying a blank by utilizing a copy blank button 554, deleting a blank by utilizing a delete blank button 555, shifting a blank in either an X direction or Y direction by utilizing a "Placement" section 556, and rotating a blank by utilizing Placement section 556. In addition, a blank pitch may be received at step 512 by utilizing "Pitch & Width" section 557. Also shown in Pitch & Width section 557 is inputs for top and bottom web sizes for a strip. Accordingly, a strip web size is received by progressive die design application 118 at step 514. In addition, a strip width is determined at step 516 by progressive die design application 118 from the blank data and web size data input by progressive die designer 104. Finally, a material utilization percentage is determined at step 518 by progressive die design application 118 to alert progressive die designer 104 of the material waste so that he or she may modify any design parameters to reduce the amount of material waste.

Figure 6B:
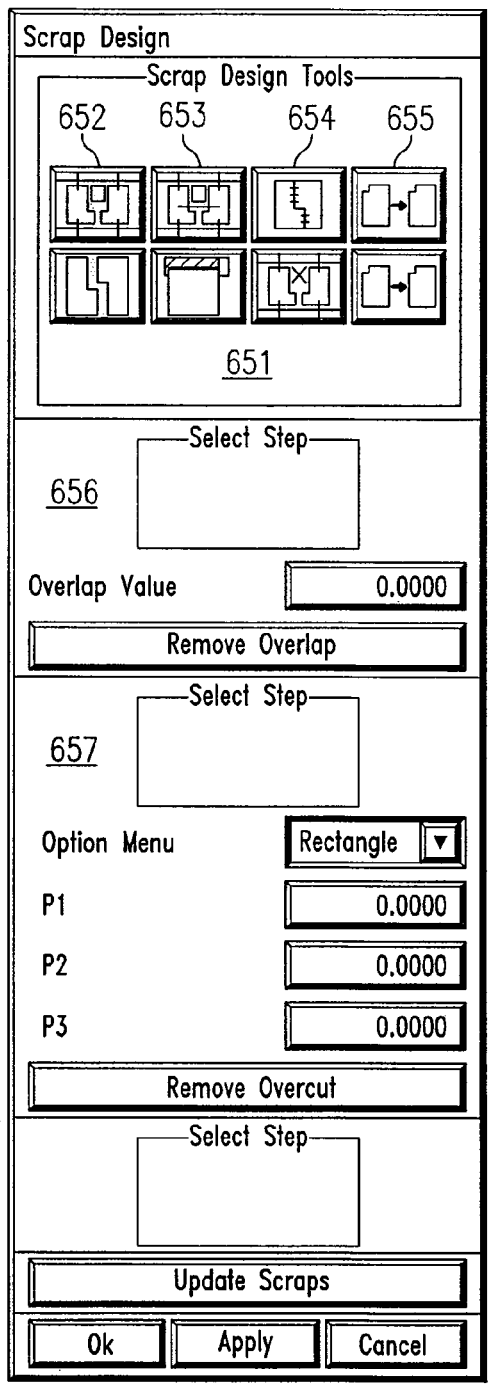
FIG. 6B is an example Scrap Design user interface used in the method of FIG. 6A.

FIG. 6A is a flowchart illustrating a computerized method of determining one or more details of a strip for a blank layout according to one embodiment of the present invention. Other embodiments may perform this method in a different manner. The method begins at step 601 where progressive die designer 104 is prompted with a Scrap Design user interface 650 as shown in FIG. 6B. Scrap Design user interface 650 allows progressive die designer 104 to design the scrap for the strip. Accordingly, assistant line information is received at step 602. Assistant lines are required to design scrap for the strip and are input by progressive die designer 104 interactively using output device 112 of computer 106.

Scrap edits are received by progressive die design application 118, as indicated by step 604. A scrap design tools section 651 may be utilized to design the scrap for the strip. For example, a whole scrap design button 652 may be used to design the whole scrap, a split scrap design button 653 may be used to split the whole scrap or larger scraps into scraps with simple geometry, two scraps may be merged by utilizing a merge scrap button 654, or progressive die designer 104 may insert user-defined scraps utilizing a user-defined scrap button 655. Other suitable scrap edits may be received, such as deleting a user-defined scrap or moving a scrap. The method continues at step 606 were an overlap for a scrap is received. Progressive die designer 104 may utilize an overlap design section 656 to select an edge of a scrap where an overlap will be added and to enter an appropriate overlap value. An overcut for an overlap may be received at step 608. Progressive die designer 104 may utilize an overcut design section 657 to add overcut corners to a scrap overlap. In this section, progressive die designer 104 selects one end side of an overlap of the specified scrap, enters the parameters of a reasonable overcut, and chooses the Apply button to show the result or the OK button to accept. The method then continues at step 610, as outlined below.

Figure 6C:
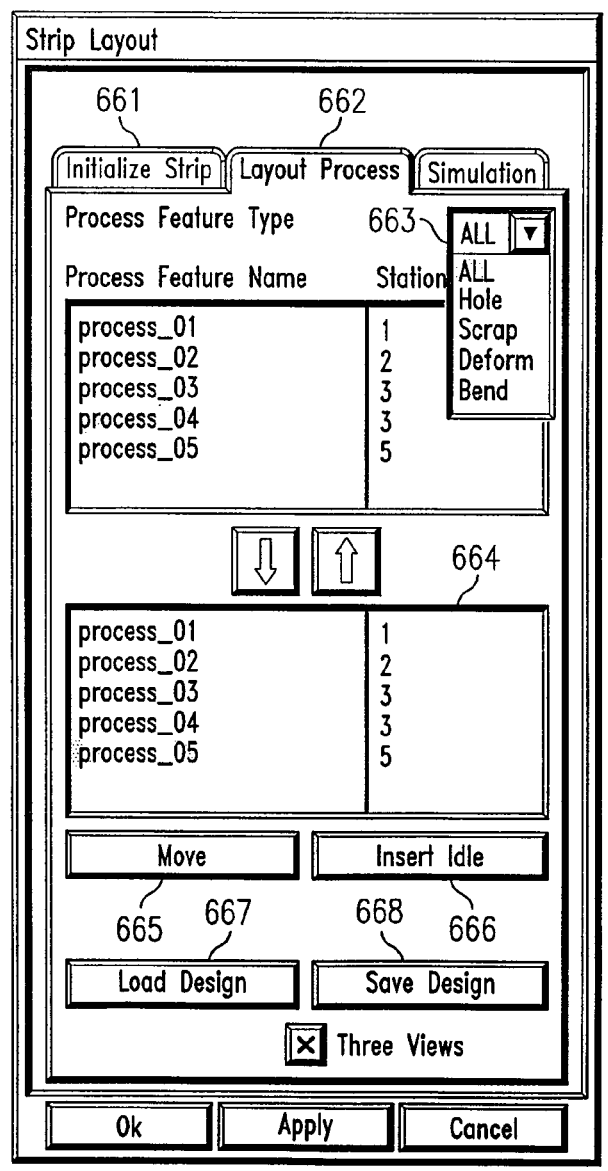
FIG. 6C is an example Strip Layout user interface used in the method of FIG. 6A.

At step 610, progressive die designer 104 is prompted with a Strip Layout user interface 660, an example of which is shown in FIG. 6C. Strip Layout user interface 660 allows progressive die designer 104 to design a strip. Using an "Initialize Strip" tab 661, progressive die designer 104 may input a feed direction for the strip. This feed direction is received by progressive die design application 118, as indicated by step 612. Progressive die design application 118 also receives the number of stations for the strip at step 614. This is also input by progressive die designer 104 utilizing Initialize Strip tab 661. Both the feed direction and the number of stations may be modified at a later time.

At step 616, both laid and unlaid process sub-types and their associated station numbers are listed in a "Layout Process" tab 662. An example of a "Layout Process" tab 662 is shown in FIG. 6C. Utilizing "Layout Process" tab 662, processes and sequence edits are received by progressive die designer 118, as indicated by step 618. This is where progressive die designer 104 may add or delete processes and/or their sub-types for a particular part feature and/or determine a sequence for the process and/or process sub-types. In other words, progressive die designer 104 may specify which process or process sub-type is utilized in a particular station. Referring to FIG. 6C, a pull-down menu 663 may be used to select the part feature. Progressive die design application 118 automatically, based on the part feature selected, lists both the laid and unlaid processes and/or process sub-types and their corresponding station based on rules contained in rules database 120. Progressive die designer 104 may then add or remove processes and/or process sub-types from a laid process list 664 and also select which station a particular process is to be performed.

The method continues at step 620 where station edits are received by progressive die design application 118. This may include moving a station via a "Move" button 665 and/or inserting an idle station by utilizing an "Insert Idle" button 666. The method then continues at step 622 where a strip layout is determined by progressive die design application 118. A "Load Design" button 667 may be utilized for this strip layout. A particular strip layout may be stored in blank and strip database 126 at step 624 by utilizing a "Save Design" button 668 as shown.

Once the strip layout is designed by via Strip Layout user interface 660, a simulation of the operations of the processes on the strip is executed by progressive die design application 118. In one embodiment, this simulation is carried out in three-dimensions ("3-D") so that progressive die designer 104 may be alerted to any potential interferences or any other problems associated with the processes and/or their associated operations when forming features in the part. Based on this simulation, progressive die designer 104 may modify the process sub-types and/or their operations by utilizing Strip Layout user interface 660. These modifications are received, as indicated by step 628, by progressive die design application 118 before another simulation is run. This simulation avoids having to actually construct a physical progressive die to determine any interferences or other problems, which saves considerable time and money in designing a progressive die. Another important advantage is that a 3-D simulation is much more useful to progressive die designer 104 because it is much easier to view and evaluate things, such as a strip, in three dimensions than it is in two dimensions.

The method continues at step 630 where a press force associated with each operation is determined by progressive die design application 118. Accordingly, a press force center for the progressive die is determined at step 632. This allows progressive die designer 104 to determine the press setup for a particular progressive die and its associated press force. It also may alert progressive die designer 104 to any potential problems based on the operations used to form particular features in a part.

FIG. 7 is a flowchart illustrating a computerized method of determining information regarding a die base based on details of a strip according to one embodiment in the present invention. Other embodiments may perform this method in a different manner. The method begins at step 701 where progressive die designer 104 is prompted with a Progressive Die Base Management user interface (not shown). This user interface allows progressive die designer 104 to generally design the die base and its associated die plates. In addition, it allows progressive die designer 104 to configure the configurable items of the die base.

At step 702, a die base size is determined, based on the strip details determined above, by progressive die design application 118. Progressive die design application 118 may retrieve a die base template from die base and insert group database 128 to start with. This die base template is loaded at step 704 with its associated configurable items. Edits for the configurable items for the die base may be received, as indicated by step 706. These configurable items are such things as die plates, guide posts, screw/fasteners, dowel pins, guide lifter sets, and stripper springs. The details of these configurable items are contained in die base and insert group database 128 so that progressive die designer 104 may use a Standard Part Management user interface (not shown) to configure these configurable items. Once all edits are received for the configurable items, the die base configuration is updated at step 708 by progressive die design application 118.

Die base and/or die plate edits are received at step 710. This may include, for example, rotating the die base, moving the die base, editing the die base, splitting a die plate, or other suitable die plate edits. A "Design Tools" tab (not shown) of the Progressive Die Base Management user interface may be used to edit the die base and/or the die plates. Accordingly, the die base and die plates are updated at step 712 by progressive die design application 118, which ends the method illustrated in FIG. 7.

Figure 8B:
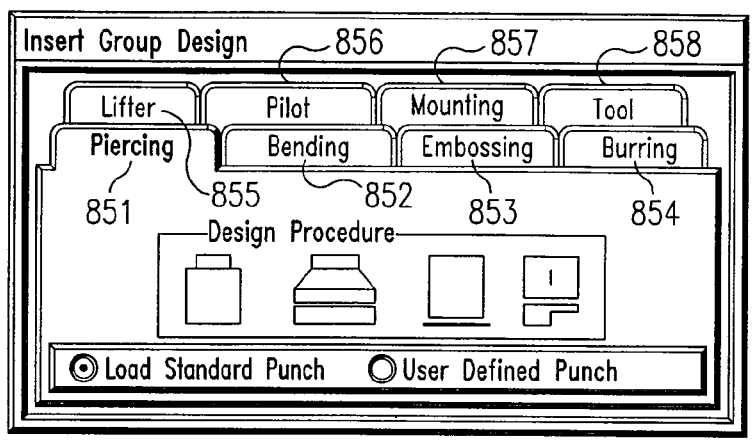
FIG. 8B is an example Insert Group Design user interface used in the method of FIG. 8A.
Figure 8C:
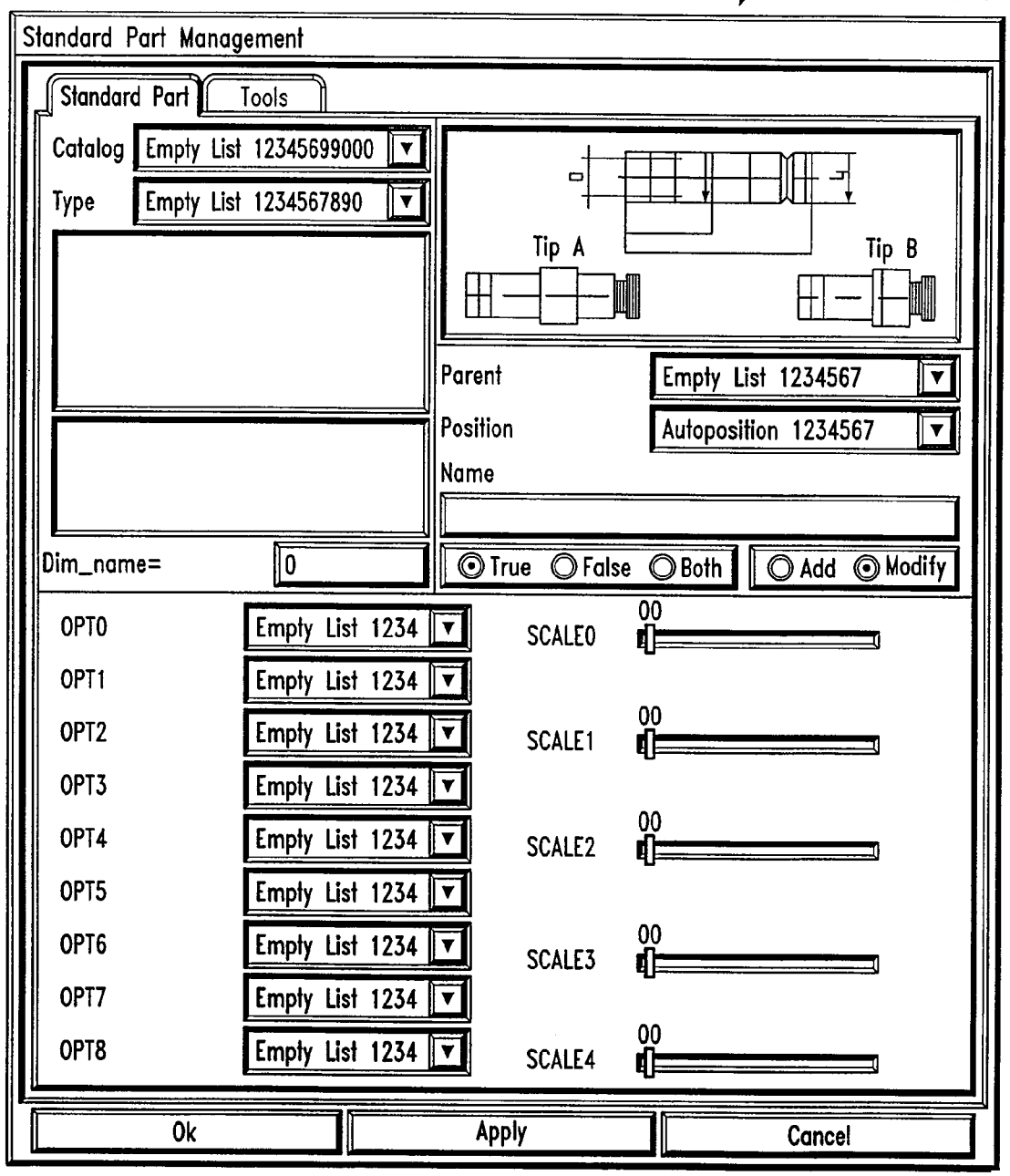
FIG. 8C is an example Standard Part Management sub-user interface used in the method of FIG. 8A.

FIG. 8A is a flowchart illustrating a computerized method for receiving information regarding one or more inserts for die plates of a die base according to one embodiment of the present invention. Other embodiments may perform this method in a different manner. The method begins at step 801 where progressive die designer 104 is prompted with an Insert Group Design user interface 850, an example of which is shown in FIG. 8B. User interface 850 allows progressive die designer 104 to design the insert groups for the die plates. Based on the features of the part, and the processes, process sub-types, and operations used to form the features, progressive die design application 118 automatically loads details of certain insert groups from die base insert group database 128. For example, when progressive die designer 104 is designing the piercing insert group using a "Piercing" tab 851, he or she may use a sub-user interface 860 as shown in FIG. 8C. Sub-user interface 860 lists details of a standard piercing insert group design and allows progressive die designer 104 to modify the design information based on the progressive die's needs. Each of the insert groups required are designed similarly.

As indicated by step 802, piercing insert group information is received by progressive die design application 118. This is facilitated by "Piercing" tab 851 as shown in FIG. 8B. Insert Design user interface 850 includes other tabs such as a "Bending" tab 852, an "Embossing" tab 853, a "Burring" tab 854, a "Lifter" tab 855, a "Pilot" tab 856, a "Mounting" tab 857, and a "Tool" tab 858 to design the insert groups. A Standard Part Management user interface 860 is available for each of the insert groups so that progressive die designer 104 may specify the parameters for a particular insert group.

Referring back to FIG. 8A, bending insert group information is received by progressive die design application 118, as indicated by step 804. This may include the type of bend, the bend area, the details for the bend insert, and the details for the mating insert to bend the feature.

Embossing insert group information is received by progressive die design application 118, as indicated by step 806. This may include the embossing faces, loading the embossing inserts, and designing the patch insert head.

Burring insert group information is received by progressive die design application 118, as indicated by step 808. This may include designing the burring insert and positioning the burring insert.

Lifter insert group information is received by progressive die design application 118, as indicated by step 810. This may include designing the type of lifter, selecting the point for the lifter, and selecting the strip edge for the lifter. Lifters are used to lift the sheet-metal strip so it may be moved from station to station.

Pilot insert group information is received by progressive die design application 118, as indicated by step 812. This may include designing the pilot insert and positioning the pilot. The pilot length may also be calculated at this step.

Mounting insert group information is received by progressive die design application 118, as indicated by step 814. This may include selecting the type of mounting faces and designing the mounting inserts. The mounting insert group is for designing the type of mounting of the various punches and dies to the die plates.

Insert group edits are received by progressive die design application 118, as indicated by step 816. This is accomplished with the help of "Tool" tab 858. This may include such things as rotating an insert group, moving an insert group to another position, removing a selected insert group, copying a selected insert group, or creating an array of a selected insert group.

Because of the various features of the part, relief cavities must be utilized. Accordingly, relief cavity information is received by progressive die design application 118, as indicated by step 820. A Relief Design user interface (not shown) is used to allow progressive die designer 104 to design a relief type. For example, one or more solid bodies are created to cut out pockets and holes and other suitable cavities on the die plates to avoid interferences between the features formed in the strip and the die plates. For example, there may be three kinds of relief bodies: block, cylinder and user-defined. Progressive die designer 104 has the ability to mathematically describe the type of relief. Once the relief is designed, progressive die designer 104 is prompted, at step 822, with a Create Pockets user interface (not shown). Accordingly, pocket information is received at step 824. This pocket information is utilized by progressive die design application 118 to automatically create pockets according to the insert groups. After the pockets information is received, the die base and die plates are updated at step 826, which ends the method outlined in FIG. 8A.

FIG. 9 is a flowchart illustrating a computerized method of generating one or more outputs associated with a progressive die according to one embodiment of the present invention. Other embodiments may perform this method in a different manner. The method begins at step 901 where progressive die designer 104 is prompted with an Output Preferences user interface (not shown). This user interface allows progressive die designer 104 to select what outputs he or she desires and allows progressive die designer 104 to specify how the die base, die plates, insert groups, etc., are displayed on output device 112. Progressive die designer 104 preferences on desired outputs are received, as indicated by step 902. This may include providing a tool to let the designer 104 control a progressive die components' color and visibility, or specify what type of printouts are desired. For example, at step 904, detailed drawings for the progressive die and its components may be generated. In addition, bills of material for the progressive die may be generated at step 906, or a hole table for the progressive die may be generated at step 908. Printer 108 may be used to print these desired outputs. Other suitable outputs may be specified by designer 104.

Thus, the present invention provide a computerized method and system for designing progressive dies used in manufacturing parts formed from sheet metal. Some embodiments of the present invention capture the industry's specific process knowledge, promote the most efficient workflow, and link complex elements of progressive die design technology into automated sequences. What once was only in the minds of experts may now be easily utilized by less experienced people. By automatically extracting sheet metal features and mapping them to process features, representing a company's design standards, users can capture a multitude of designs. Efficient and easy-to-use blank layout design tools enable designers to efficiently lay out process features in numerous operation stations while minimizing material scrap. Once done, 3D strip layout simulations provide immediate feedback for design and process changes. In addition, customizable die base libraries, standard part libraries, and insert group libraries expedite the die structure design and ensure that users' complete processes are handled effectively.

Although embodiments of the invention and their advantages are described in detail, a person skilled in the art could make various alterations, additions, and omissions without departing from the spirit and scope of the present invention as defined by the appended claims.

What is claimed is:

1. A computerized method for designing a progressive die used in the manufacturing of a part formed from sheet metal, comprising:
   receiving, at a computer, information regarding one or more features of the part;
   determining, by the computer, one or more details of a blank layout for the part;
   determining, by the computer, one or more details of a strip for the blank layout;
   determining, by the computer, information regarding a die base, the die base having a plurality of die plates;
   determining, by the computer, information regarding one or more inserts for the die plates based on one or more operations of one or more processes needed to form the features in the part; and
   generating, by the computer, one or more outputs associated with the progressive die.

2. The computerized method of claim 1, further comprising:
   determining, by the computer, the one or more processes needed to form the features in the part;
   determining, by the computer, the one or more operations associated with each process; and
   receiving, at the computer, one or more parameters associated with each operation.

3. The computerized method of claim 1, further comprising:
   receiving, at the computer, information regarding one or more scrap profiles for the strip;
   receiving, at the computer, a sequence of the operations of the processes;
   simulating, by the computer, the operations of each process on the strip;
   notifying, via a visual display unit, a user of one or more results of the simulating step; and
   receiving one or more modifications of at least one parameter of at least one operation.

4. The computerized method of claim 1, further comprising:
   receiving, at the computer, one or more parameters associated with one or more configurable items for the die plates.

5. The computerized method of claim 1, further comprising:

receiving, at the computer, one or more parameters associated with the inserts;

determining, by the computer, one or more relief cavities for the die plates;

and generating, by the computer, one or more pockets for the die plates.

6. The computerized method of claim 1, wherein determining, by the computer, the blank layout for the part is based on imported blank information.

7. The computerized method of claim 1, wherein determining, by the computer, one or more details of the strip comprises receiving, at the computer, a feed direction of the strip, a width of the strip, and a length of the strip based on the number of stations for the progressive die.

8. The computerized method of claim 1, wherein generating, by the computer, one or more outputs associated with the progressive die comprises generating a printout selected from the group consisting of at least one assembly drawing, a bill of material, and a hole table.

9. A computerized method for designing a progressive die used in the manufacturing of a part formed from sheet metal, comprising:

receiving, at a computer, information regarding one or more features of the part;

determining, by the computer, one or more processes needed to form the features in the part;

determining, by the computer, one or more operations associated with each process;

receiving, at the computer, one or more parameters associated with each operation;

determining, by the computer, one or more details of a strip;

receiving, at the computer, information regarding one or more scrap profiles for the strip;

receiving, at the computer, a sequence of the operations of the processes;

simulating, by the computer, the operations of the processes on the strip;

determining, by the computer, information regarding a die base based on the details of the strip, the die base having a plurality of die plates;

receiving, at the computer, one or more parameters associated with one or more configurable items for the die plates;

determining, by the computer, information regarding one or more inserts for the die plates based on the operations of the processes needed to form the features in the part;

receiving, at the computer, one or more parameters associated with the inserts;

determining, by the computer, one or more relief cavities for the die plates;

generating, by the computer, one or more pockets for the die plates; and generating, by the computer, one or more outputs associated with the progressive die.

10. The computerized method of claim 9, further comprising:

determining, by the computer, a press force associated with each operation; and determining, by the computer, a press force center for the progressive die based on the press force associated with each operation.

11. The computerized method of claim 9, further comprising:

notifying, via a visual display unit, a user of one or more results of the simulating step; and receiving one or more modifications of at least one parameter of at least one operation.

12. The computerized method of claim 9, wherein determining, by the computer, one or more details of the strip comprises receiving, at the computer, a feed direction of the strip, a width of the strip, and a length of the strip based on the number of stations for the progressive die.

13. The computerized method of claim 9, wherein generating, by the computer, one or more outputs associated with the progressive die comprises generating a printout selected from the group consisting of at least one assembly drawing, a bill of material, and a hole table.

14. A system for designing a progressive die used in the manufacturing of a part formed from sheet metal, comprising:

a computer-readable medium;

a computer program stored on the computer-readable medium operable to instruct a computer to:

receive information regarding one or more features of the part; determine one or more details of a blank layout for the part;

determine one or more details of a strip for the blank layout;

determine information regarding a die base, the die base having a plurality of die plates;

determine information regarding one or more inserts for the die plates based on one or more operations of one or more processes needed to form the features in the part; and generate one or more outputs associated with the progressive die.

15. The system of claim 14, wherein the computer program is further operable to:

determine the one or more processes needed to form the features in the part;

determine the one or more operations associated with each process; and receive one or more parameters associated with each operation.

16. The system of claim 14, wherein the computer program is further operable to:

receive information regarding one or more scrap profiles for the strip;

receive a sequence of the operations of the processes;

simulate the operations of each process on the strip;

notify, via a visual display unit, a user of one or more results of the simulating step; and receive one or more modifications of at least one parameter of at least one operation.

17. The system of claim 14, wherein the computer program is further operable to:

receive one or more parameters associated with one or more configurable items for the die plates.

18. The system of claim 14, wherein the computer program is further operable to:

receive one or more parameters associated with the inserts; determine one or more relief cavities for the die plates; and generate one or more pockets for the die plates.

19. The system of claim 14, wherein the computer program determines the blank layout for the part based on imported blank information.

20. The system of claim 14, wherein the computer program is further operable to receive a feed direction of the strip, a width of the strip, and a length of the strip based on the number of stations for the progressive die.

* * * * *